(No Model.)

J. FLANNERY.
ANTI FRICTION BEARING.

No. 316,026. Patented Apr. 21, 1885.

WITNESSES:  INVENTOR:
Theo. G. Hoster  John Flannery
Chas. Lurcott  BY Munn & Co.
ATTORNEYS.

UNITED STATES PATENT OFFICE.

JOHN FLANNERY, OF NEW YORK, N. Y.

ANTI-FRICTION BEARING.

SPECIFICATION forming part of Letters Patent No. 316,026, dated April 21, 1885.

Application filed September 15, 1884. (No model.)

*To all whom it may concern:*

Be it known that I, JOHN FLANNERY, of the city, county, and State of New York, have invented a new and Improved Anti-Friction Bearing for Propeller-Shafts, of which the following is a full, clear, and exact description.

The object of this invention is to reduce the friction of propeller-shafts in their bearings, at the same time permitting the bearing to be drawn up tight, so that there will be little or no lost motion lengthwise without increasing the friction.

The invention consists in the combination, with the shaft, journal-box, and a collar on the shaft, of disks, on which anti-friction rollers are mounted, arranged between the collar and the ends of the box.

Reference is to be had to the accompanying drawings, forming part of this specification, in which similar letters of reference indicate corresponding parts in both the figures.

Figure 1:
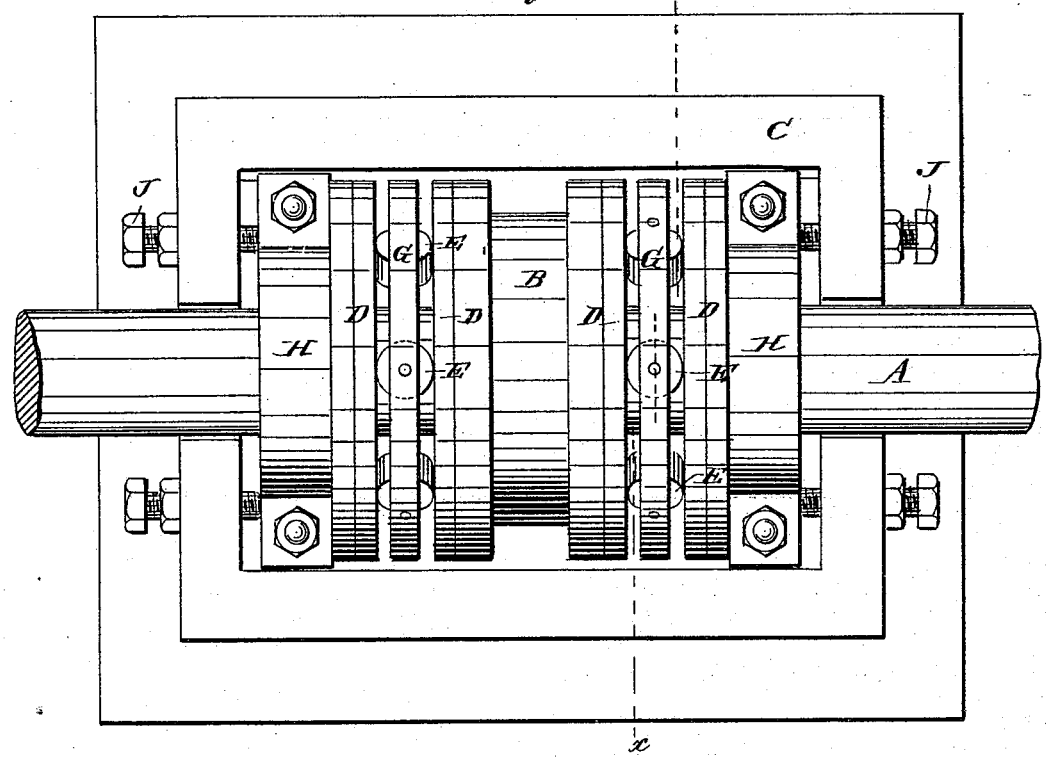
Figure 2:
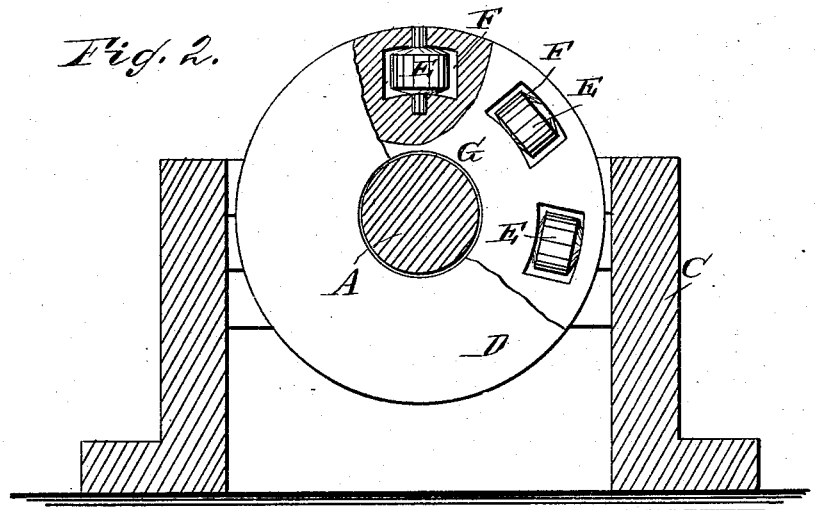

Figure 1 is a plan view of my improved anti-friction bearing for propeller-shafts. Fig. 2 is a cross-sectional elevation of the same on the line *x x*, Fig. 1.

On the propeller-shaft A a collar, B, is keyed, or is securely fastened in any other suitable manner. The collar B is located about in the middle of the journal-box C, and against the sides of the collar disks D rest, against which rollers E rest, which are pivoted in slots F in disks G, the rollers projecting from both surfaces of the disks G, and the axes of the rollers are arranged radially. Against the disk G plain disks D rest, which can be pressed toward the collar B on the shaft A by journal-pieces H, acted on by screws J in the ends of the box C. The disks G, carrying the rollers E, are held between two plain disks, D, which rest against the collar B and the journal-pieces H. The rollers carried by the disks G reduce the friction very much and prevent wearing of the parts.

The disks can all be pressed firmly against the collar B, to prevent lost motion in the direction of the length of the shaft without increasing the friction.

If desired, balls may be used in place of rollers.

Having thus fully described my invention, I claim as new and desire to secure by Letters Patent—

1. The combination, with a propeller-shaft and its box, of a fixed collar on the shaft and a disk carrying anti-friction rollers mounted on the shaft between the fixed collar and the ends of the box, substantially as herein shown and described.

2. The combination, with the propeller-shaft A, the fixed collar B, and the box C, of the disks D, the disk G, mounted on the shaft and provided with friction-rollers E, and means for adjusting the disks D, substantially as herein shown and described.

3. The combination, with the propeller-shaft A, the fixed collar B, and the box C, of the plain disks D, the disk G, provided with the rollers E, the journal-piece H, and the screws J, substantially as herein shown and described.

JOHN FLANNERY.

Witnesses:
OSCAR F. GUNZ,
JOHN QUINN.